United States Patent [19]

Beisel

[11] 4,373,322
[45] Feb. 15, 1983

[54] FLAIL-VACUUM SEED HARVESTER

[76] Inventor: Victor A. Beisel, Rte. 1, Fargo, Okla. 73840

[21] Appl. No.: 302,168

[22] Filed: Sep. 14, 1981

[51] Int. Cl.³ .............................................. A01D 45/30
[52] U.S. Cl. ...................................... 56/126; 56/13.3; 56/16.6; 56/130; 56/DIG. 12
[58] Field of Search .................................. 56/126–130, 56/13.2, 13.3, 13.4, 35, 16.6, 198, 199, 364, DIG. 8, DIG. 12, 328 R, 330

[56] References Cited

U.S. PATENT DOCUMENTS

| 273,035 | 2/1883 | Curry | 56/35 |
|---|---|---|---|
| 1,212,053 | 1/1917 | Hatheway | 56/126 |
| 1,370,919 | 3/1921 | Schaefer | 56/130 |
| 1,587,349 | 6/1926 | Otis et al. | 56/128 |
| 2,460,029 | 1/1949 | Ramp | 56/13.2 |
| 2,623,344 | 12/1952 | Stafford | 56/129 |
| 3,184,905 | 5/1965 | Hillier | 56/130 |
| 3,911,650 | 10/1975 | Johnson | 56/13.3 |

FOREIGN PATENT DOCUMENTS

| 976171 | 11/1964 | United Kingdom | 56/126 |
| 1136471 | 12/1968 | United Kingdom | 56/199 |

Primary Examiner—Jay N. Eskovitz
Attorney, Agent, or Firm—Harvey B. Jacobson

[57] ABSTRACT

An elongated hollow housing is provided including front and rear sides and opposite ends. The housing defines an air passage extending therethrough including an inlet end opening through and extending longitudinally of the front side of the housing. The housing also defines an outlet for the passage opening outwardly of the housing remote from the inlet. Seed separating structure is provided within the air passage intermediate the inlet and outlet and is operative to separate seeds from the air flow moving through the passage. The inlet is defined between opposing generally parallel longitudinal marginal portions of the housing and one marginal portion is disposed forward and above the other marginal portion, whereby the inlet opens outwardly of the housing in a foward and downward direction. An elongated seed stripping rotary brush is journaled in the housing for rotation about an axis extending longitudinally thereof with between 30° and 90° of the periphery of the brush registered with the inlet. Motor structure is drivingly coupled to the brush for rotation of the latter in a direction to swing the brush bristles into the inlet from the aforementioned other marginal portion and from the inlet past the aforementioned one marginal portion. The housing has been constructed for support from the vertically swingable support arms of a front loader bucket supporting mechanism mounted on a tractor.

6 Claims, 3 Drawing Figures

FLAIL-VACUUM SEED HARVESTER

BACKGROUND OF THE INVENTION

Various forms of seed harvesters heretofore have been provided for harvesting seeds from tall grasses. However, most of these harvesters utilize complex structure for separating seeds from the grass stalks and further utilize their own mobile platforms. Accordingly, previously known forms of seed harvesters are expensive to purchase and require considerable maintenance.

BRIEF DESCRIPTION OF THE INVENTION

The seed harvester of the instant invention comprises an elongated hollow housing adapted for support from front loader bucket arms mounted on a tractor with the housing extending transversely of the forward end of the tractor. The housing includes an inlet which opens forwardly and downwardly and in which a rotary brush is mounted for advancing against the upper seed bearing ends of grasses. The brush is driven in a direction wherein the lower marginal portion thereof moves forwardly and the brush is effective to strip the seeds from the upper ends of tall grasses and to convey the stripped seeds into the housing where they are separated from the air flow moving through the housing by centrifugal force and collected in a seed collection point from which the seeds may be subsequently removed.

The main object of this invention is to provide an effective seed harvester which may be utilized to harvest seeds from tall grasses.

Another object of this invention is to provide a seed harvester in accordance with the preceding object and which may be readily mounted upon the forward end of a tractor equipped with front loader bucket support arms.

Yet another object of this invention is to provide a seed harvester including only one movable component thereof comprising a rotary brush and which may be readily driven through the utilization of a hydraulic motor receiving a supply of hydraulic fluid under pressure from the associated tractor.

A final object of this invention to be specifically enumerated herein is to provide a seed harvester in accordance with the preceding objects and which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE INVENTION

Figure 1:
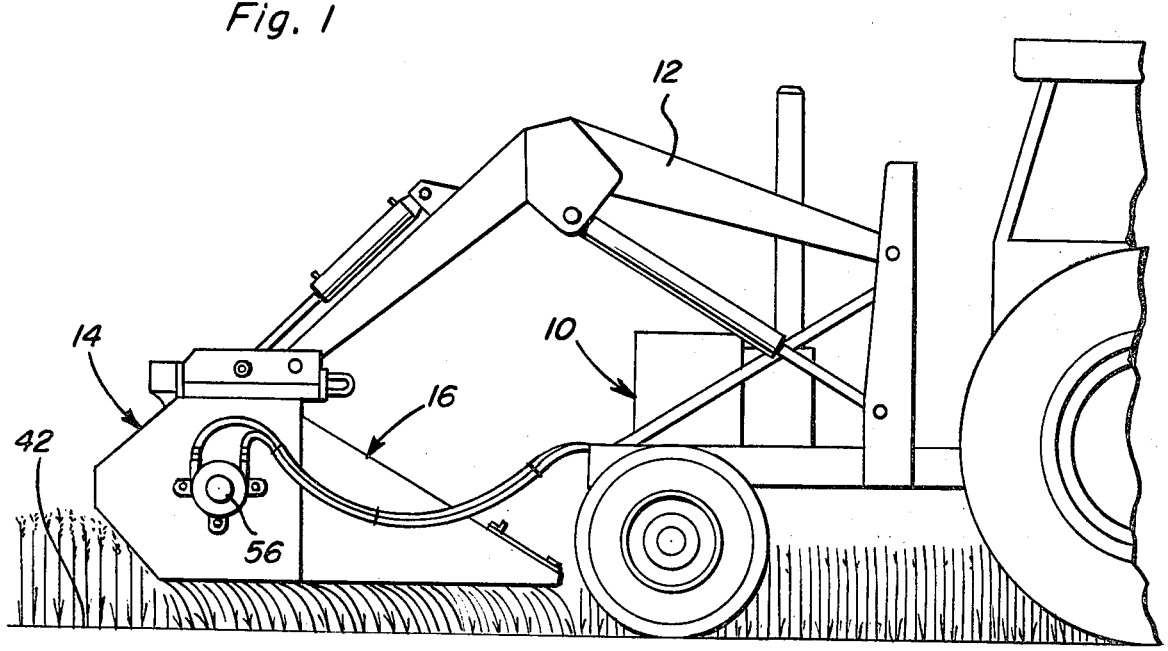
FIG. 1 is a side elevational view of a conventional form of farm tractor equipped with loader bucket support arms and with the seed harvester of the instant invention supported from the vertically swingable free ends of the bucket support arms.

Referring now more specifically to the drawings, the numeral 10 generally designates a conventional form of farm tractor equipped with front loader support arms 12 and the seed harvester of the instant invention is referred to in general by the reference numeral 14 and supported from the free ends of the support arms 12.

Figure 2:
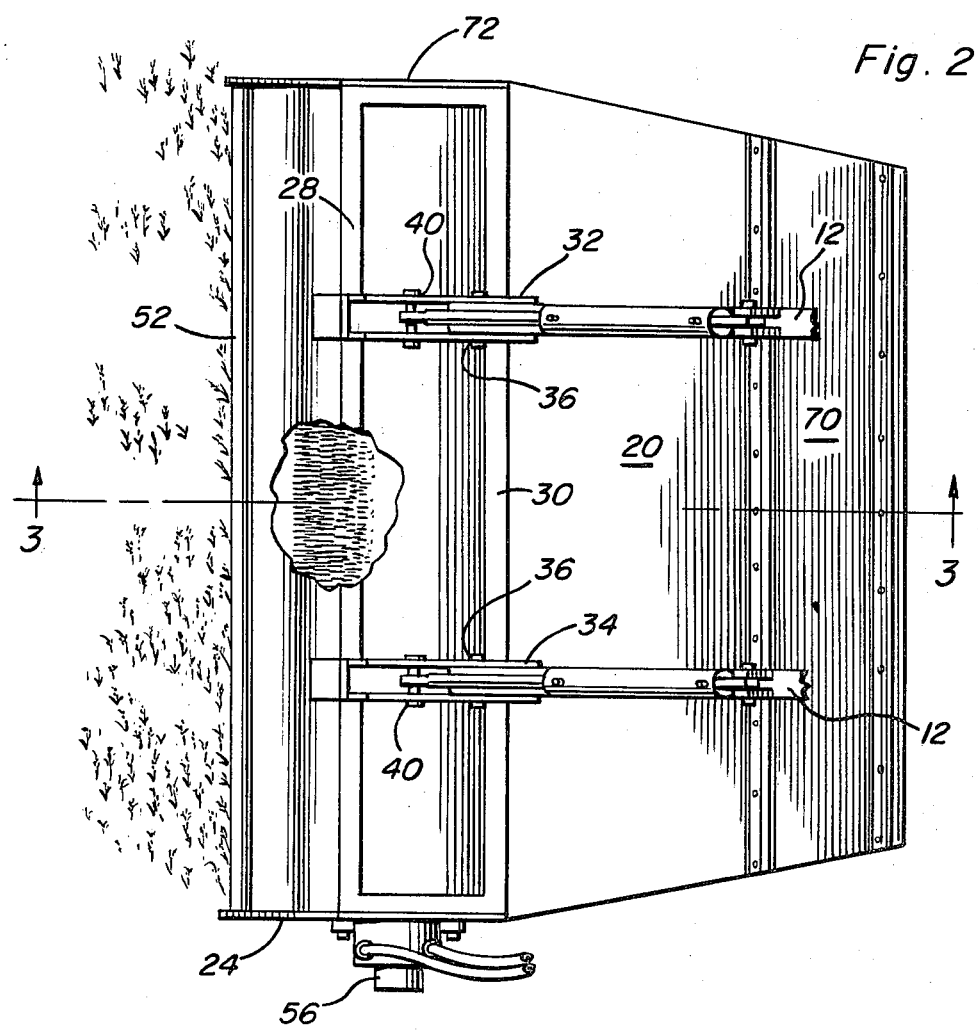
FIG. 2 is an enlarged fragmentary top plan view of the left hand portion of the structure illustrated in FIG. 1.

With attention now invited more specifically to FIGS. 2 and 2 of the drawings, it may be seen that the harvester 14 includes an elongated housing 16 having front and rear sides 18 and 20, opposite ends 22 and 24 and a bottom wall 26. The housing 16 is suspended from a pair of front and rear upper longitudinal frame members 28 and 30 from which a pair of longitudinally spaced mounts 32 and 34 are supported. The mounts 32 and 34 are pivotally supported from the arms 12 as at 36 and the free ends of double acting tilting cylinders 38 anchored relative to the arms 12 are pivotally attached to the mounts 32 and 34 as at 40.

The housing 16 extends transversely of the tractor 10 and may be inclined about its axis of oscillation relative to the arms 12 by the tilting cylinders 38. In addition, the elevation of the housing 16 above the ground 42 over which the tractor 10 is moving may be adjusted by adjustment of the arms 12.

The housing 16 defines an air passage 44 extending therethrough including an inlet 46 and an outlet 48. The inlet 46 is defined between first and second opposing longitudinal front marginal portions 50 and 52 of the housing 16. The marginal portion 52 is spaced forward and above the marginal portion 50 with the vertical spacing of the marginal portion 52 above the marginal portion 50 being greater than the horizontal spacing of the marginal portion 52 forward of the marginal portion 50.

An elongated cylindrical brush 54 including generally radial brush bristles 56 is journaled in the housing 16 between the opposite ends 22 and 24 thereof and has between 30° and 90° of the periphery of the brush registered with the inlet 46. A hydraulic motor 56 is supported from the end 24 and drives the brush 54 in a clockwise direction as viewed in FIG. 3 of the drawings whereby the brush bristles 56 swing pass the marginal portion 50 into the inlet 46 and from the inlet 46 pass the marginal portion 52. The front side 18 of the housing 16 is defined by a generally partial cylindrical shield portion which extends rearwardly and upwardly from the marginal portion 52 and is downwardly concave. The rear portion of the shield portion 18 extends rearwardly and downwardly at approximately 30° and includes a planar rear extension portion 60. In addition, a lower partial cylindrical shield portion 62 is disposed within the housing 16 and extends rearwardly from the marginal portion 50 and curves upwardly toward its rear end. The shield portions 18 and 62 include arcuate portions which are between 90° and 120° in angular extent. Further, it will be noted from FIG. 3 that the rear side 20, including the bottom wall 26, defines a horizontally forwardly opening rear housing portion into which the extension portion 60 projects, the latter being spaced below and generally paralleling the rear side 20.

The upper rear portion of the shield 62 terminates a spaced distance below the rearwardly and downwardly extending extension portion of the shield portion 18 and the brush 54 is effective as a turbine impeller to draw air inward through the inlet 46 and rearward about the underside of the shield portion 18. However, the outlet 48 is defined between the members 28 and 30 at the upper marginal portion of the extension 60 and accordingly, air passing through the housing 16 from the inlet 46 to the outlet 48 moves in the direction of the phantom lines 64 up over the upper portion of the brush 54 and rearward beneath the extension 60 before making a 180° turn forwardly and upwardly along the extension 60 toward the outlet 48. As the air moving through the housing 16 moves around the rear free end of the extension 60, the seeds within the air stream continue to move rearwardly and downwardly by centrifugal force and are collected in a collection point 66 defined on the upper surface of the rear portion of the bottom wall 26. The rear lower marginal portion of the rearwardly and downwardly inclined rear side 20 of the housing 16 includes an access opening 68 formed therein closed by a flexible flap 70. In order to remove the seeds from the collection point 66, the flap 70 is lifted upwardly toward the phantom line position thereof illustrated in FIG. 3, thereby providing access to the collected seeds.

Figure 3:
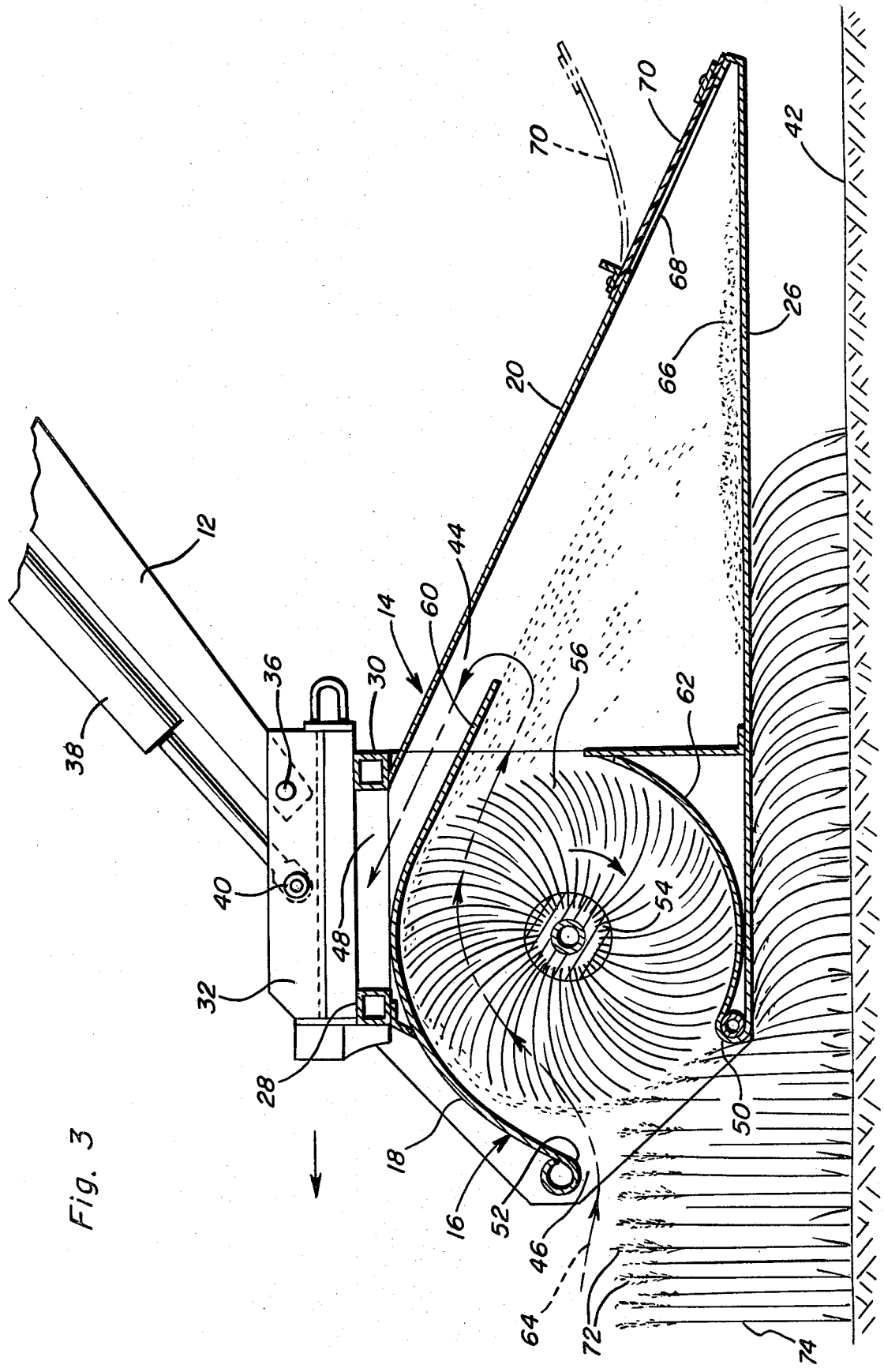
FIG. 3 is an enlarged vertical sectional view taken substantially upon the plane indicated by the section line 3—3 of FIG. 2.

In operation, the housing 16 is supported from the arms 12 in the manner illustrated in FIG. 3 of the drawings and is advanced against the seeds 72 carried by the upper portions of the grass 74. The seeds 72 are stripped from the grass 74 and swept upwardly and rearwardly through the passage 44 and thereafter separated from the air stream moving through the passage 44 as the air moves about the rear lower marginal portion of the extension 60. The elevation of the housing 16 may be readily adjusted according to the height of the seeds 72 by operation of the lift arms 12 and the speed of rotation of the brush 54 may be determined by speed of operation of the motor 56.

The harvester 14 is extremely efficient in harvesting the seeds 72 and, as may be observed, is extremely simple in construction and includes only one moving part. Furthermore, the harvester 16 may be readily supported from any suitable lift arm assembly carried by the forward end of a tractor or other similar piece of farm equipment.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A flail-vacuum seed and grain harvester, said harvester including an elongated horizontal housing adapted to be horizontally laterally advanced against a seed or grain crop and defining front and rear longitudinal sides and opposite ends, said housing including a pair of vertically spaced and registered downwardly concave and upwardly concave upper and lower generally partial cylindrical members, each of less than 180° in angular extent, extending between said ends and including corresponding front and rear arc end marginal portions extending longitudinally of said housing, the spacing between said partial cylindrical members defining a front-to-rear extending passage in said housing having an inlet end disposed between said front arc end marginal portions and an outlet end disposed between said rear arc end marginal portions, an elongated seed stripping rotary brush journalled in said housing between and extending longitudinally of said partial cylindrical members and including bristle ends which sweep across the opposing concave sides of said partial cylindrical members, the forward arc end portion of said upper partial cylindrical member diverging outwardly from the cylindrical path through which the outer periphery of said brush swings, the rear arc end portion of said upper cylindrical member including an extension extending generally tangentially rearwardly and downwardly from said path at an elevation spaced above the rear arc end of said lower partial cylindrical member, said housing including a longitudinally extending rear portion thereof disposed rearwardly of the axis of rotation of said brush and which is generally horizontal V-shaped in cross section and opens forwardly toward said brush, the free ends of the diverging leg portions of said horizontal V-shaped rear portion being generally horizontally aligned with the upper and lower peripheries of said brush, said tangential extension projecting into said rear portion and being spaced below and generally paralleling the upper leg portion thereof, the spacing between said extension and said upper leg portion comprising an outlet slot from said rear portion of said housing, motor means drivenly connected to said brush for rotating the latter in a direction with the lower periphery thereof moving forwardly and upwardly across said inlet, said outlet opening into the rear portion of said housing below said extension, said forward arc end of said upper partial cylindrical member being disposed forward of and above the forward arc end of said lower partial cylindrical member, the lower leg of said horizontal V-shaped rear housing portion comprising a support surface for harvested seed or grain.

2. The harvester of claim 1 wherein the spacing of the forward arc end of said upper partial cylindrical member above the forward arc end of the lower partial cylindrical member is greater than the spacing of the former forward of the latter.

3. The harvester of claim 1 wherein the upper leg of said horizontal V-shaped rear housing portion includes a selectively open and closable seed and grain discharge opening formed therein closely adjacent the intersection of the rear ends of said leg portions.

4. The harvester of claim 1 wherein said housing includes means for support from front loader bucket support arms mounted on the front of a wheeled vehicle for adjustable swinging in vertical planes.

5. The harvester of claim 1 wherein said outlet slot opens upwardly through the upper portion of said housing.

6. The harvester of claim 1 wherein said partial cylindrical member are each between 90° and 120° in angular extent.

* * * * *